United States Patent
Lechler et al.

(10) Patent No.: US 11,149,596 B2
(45) Date of Patent: Oct. 19, 2021

(54) VALVE FOR VARIABLE THROTTLING OF A HYDRAULIC FLOW WITH A FATIGUE-RESISTANT MECHANICAL MEANS FOR REDUCING POSSIBLE VALVE OSCILLATIONS

(71) Applicant: Robert Bosch GmbH, Stuttgart (DE)

(72) Inventors: Andreas Lechler, Moeglingen (DE); Andrej Gardt, Abstatt (DE); Christoph Eisele, Heilbronn (DE); Edgar Kurz, Heilbronn-Horkheim (DE); Felix Schorn, Renningen (DE); Joern Kreutzer, Duelmen (DE); Marcus Biehler, Wuestenrot (DE); Michael Kloss, Ilsfeld-Auenstein (DE); Patrick Schellnegger, Ludwigsburg (DE); Wolf Stahr, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/888,837

(22) Filed: May 31, 2020

(65) Prior Publication Data
US 2020/0400045 A1 Dec. 24, 2020

(30) Foreign Application Priority Data
Jun. 19, 2019 (DE) .................. 10 2019 209 003.6

(51) Int. Cl.
*F01L 9/10* (2021.01)
*F16K 15/02* (2006.01)

(52) U.S. Cl.
CPC ............... *F01L 9/10* (2021.01); *F16K 15/02* (2013.01)

(58) Field of Classification Search
CPC .................................. F01L 9/10; F16K 15/02
See application file for complete search history.

(56) References Cited

U.S. PATENT DOCUMENTS

| | | | | |
|---|---|---|---|---|
| 2,874,684 A | * | 2/1959 | Thompson | F01L 1/245 123/90.55 |
| 3,220,391 A | * | 11/1965 | Thuesen | F01L 1/30 123/90.26 |
| 3,926,159 A | * | 12/1975 | Michelson | F01L 9/10 123/90.11 |
| 4,000,756 A | * | 1/1977 | Ule | F01L 9/20 137/596.17 |
| 4,802,448 A | * | 2/1989 | Ableitner | F01L 1/25 123/90.55 |
| 5,765,515 A | * | 6/1998 | Letsche | F01L 9/10 123/90.12 |
| 5,809,950 A | * | 9/1998 | Letsche | F01L 9/10 123/90.12 |
| 5,829,397 A | * | 11/1998 | Vorih | F01L 1/181 123/90.12 |
| 6,131,603 A | * | 10/2000 | Takano | C23C 8/34 123/188.3 |

(Continued)

*Primary Examiner* — Joseph J Dallo
(74) *Attorney, Agent, or Firm* — Maginot, Moore & Beck LLP (57) ABSTRACT

A valve for variable throttling of a hydraulic flow includes a tappet and a guide element in which the tappet is guided for movement in a stroke direction. The valve also includes at least one fatigue-resistant, mechanical member that locally reduces a radial play of the tappet so as to reduce possible valve oscillations.

12 Claims, 7 Drawing Sheets

(56) References Cited

U.S. PATENT DOCUMENTS

| | | | | |
|---|---|---|---|---|
| 6,192,841 | B1* | 2/2001 | Vorih | F01L 9/10 |
| | | | | 123/90.12 |
| 6,918,364 | B2* | 7/2005 | Vattaneo | F01L 9/11 |
| | | | | 123/90.55 |
| 8,579,251 | B2* | 11/2013 | Ambrosi | F16K 31/0693 |
| | | | | 251/129.02 |
| 2006/0137634 | A1* | 6/2006 | Vattaneo | F01L 9/11 |
| | | | | 123/90.12 |
| 2006/0137641 | A1* | 6/2006 | Geiger | F01L 1/146 |
| | | | | 123/90.59 |
| 2008/0087240 | A1* | 4/2008 | Flierl | F01L 1/26 |
| | | | | 123/90.16 |
| 2009/0007871 | A1* | 1/2009 | Bugescu | F01L 13/0005 |
| | | | | 123/90.52 |
| 2009/0217896 | A1* | 9/2009 | Schnell | F01L 1/24 |
| | | | | 123/90.51 |
| 2010/0276022 | A1* | 11/2010 | Moosmann | F16D 48/02 |
| | | | | 137/613 |
| 2017/0058878 | A1* | 3/2017 | Brasche | F04B 53/146 |
| 2019/0162085 | A1* | 5/2019 | Stucchi | F01L 1/14 |

* cited by examiner

VALVE FOR VARIABLE THROTTLING OF A HYDRAULIC FLOW WITH A FATIGUE-RESISTANT MECHANICAL MEANS FOR REDUCING POSSIBLE VALVE OSCILLATIONS

This application claims priority under 35 U.S.C. § 119 to patent application no. DE 10 2019 209 003.6, filed on Jun. 19, 2019 in Germany, the disclosure of which is incorporated herein by reference in its entirety.

BACKGROUND

The disclosure relates to a valve for variable throttling of a hydraulic flow. Furthermore, a hydraulic system for a motor vehicle with a corresponding drive is also described. In particular, various methods are also described for producing components for such a valve.

Current ABS/ESP systems provide additional functions, which support the drive, for example, in maintaining distance from the vehicle in front. This is carried out by means of active engagement of the system by pressure being built up on the wheel brake calipers without the driver himself activating the brake pedal. So that the driver does not hear any disruptive noises, there are used hydraulic damping measures which reduce the pressure pulses from the conveyor unit of the system. The damping measure is composed of a hydraulic resistance and a capacitor. For the efficiency of the hydraulic damper, a significant throttling is generally produced by means of a resistance. The disadvantage in this instance is that with the large resistance (high pressure drop), the load on the motor increases, the speed decreases and consequently the conveying power or the pressure build-up dynamics decreases.

As a counter-measure, there can be used resistances which represent in accordance with the throughflow a variable face subjected to flow. Consequently, with large volume flows, the face subjected to flow becomes greater and consequently the further increase of the pressure drop is reduced. If the variable throttles are constructed in the form of a valve (closing member and spring) with a stroke which is dependent on throughflow, flow forces act and lead to oscillation (translational and rotational) of the closure member. Pressure fluctuations are thereby produced and expand in the hydraulic system and as a result of the connection of the lines to the body can lead to noises in the passenger space. Against this background, it is desirable to at least reduce or even prevent the oscillation of the valve produced in this manner.

SUMMARY

There is proposed here a valve for variable throttling of a hydraulic flow, comprising a tappet and a guide element in which the tappet is guided for movement in the stroke direction, characterized by at least one fatigue-resistant, mechanical means which locally reduces a radial play of the tappet in order to reduce possible valve oscillations.

The valve may, for example, be a solenoid valve and/or a proportional valve. As a proportional valve, the valve (as opposed to a switching valve) enables a continuous transition between different closure member positions. Consequently, the volume flow through the valve can be adjusted in accordance with the stroke.

The valve may comprise a valve housing in which a longitudinal channel which connects a valve inlet to a valve outlet is provided. The tappet may in this context, for example, be inserted in the longitudinal channel. At one end, the tappet may be constructed with or connected to a closure member. The guide element may, for example, be arranged in the longitudinal channel or at least partially surround it.

The tappet can be moved in the guide element generally in the longitudinal direction of the valve (which generally corresponds to the stroke direction). Furthermore, there is generally provision for the mechanical means to carry out a relative movement with respect to the tappet during a stroke movement of the tappet. In this instance, at least a portion of the mechanical means can move along an outer surface of the tappet relative to the tappet. This means in other words in particular that at least a portion of the mechanical means may be in contact with an outer surface of the tappet (even during a stroke movement of the tappet, in particular constantly or continuously).

The mechanical means serves to reduce possible valve oscillations or vibrations. To this end, the means reduces a radial play of the tappet, in particular a radial play between the tappet and guide element (only) locally. The term "locally" in this context is intended to mean in particular that the radial play is reduced not over the entire periphery of the tappet and/or not over the entire length of the guide element. The local reduction of the radial play may in other words also be described in such a manner that a radial spacing (otherwise provided, in particular otherwise different from zero) between the tappet and guide element is locally reduced or is locally lower than at other locations. In particular, the mechanical means is a mechanical pretensioning means.

The mechanical (pretensioning) means affords compared with an alternative transverse force production as a result of the hydraulic flow itself in particular the advantages that the action is independent of the flow speed and fluid properties. For such a transverse force production by the hydraulic flow itself, it is generally necessary for the body which is flowed around to be constructed in an asymmetrical manner and consequently for other pressure relationships to be present on mutually opposing surface regions (in a similar manner to wings). Furthermore, the action (oscillation reduction) in the transverse force production as a result of the hydraulic flow can be achieved only for specific temperature ranges and volume flows. Changing to another fluid would result in a different behavior.

The term "fatigue-resistant" is intended in this instance in particular to be understood to mean that the mechanical means retains its outer contour and/or its (cross-sectional) geometry (over a very long, ideally infinite period of time). This advantageously enables, using the mechanical means, the radial play of the tappet or the local reduction thereof to be able to be permanently (or constantly) precisely predetermined and/or a defined pretensioning force to be able to be permanently applied to the tappet and thus undesirable valve oscillations to be able to be permanently reduced.

As a result of the fatigue-resistance of the mechanical means, it is also differentiated with respect to seals which are generally produced with at least one O-ring of rubber since these seals become worn or brittle comparatively quickly, lose material and thus already change (do not maintain) the outer contour thereof and/or the (cross-sectional) geometry thereof after a comparatively short period of time.

The mechanical (pretensioning) means affords, for example, with respect to an alternative guiding of the tappet through a resilient O-ring seal, the advantages that the radial play of the tappet or the local reduction thereof can be permanently (or constantly) precisely predetermined. In addition, using the mechanical (pretensioning) means, a (pre-)defined pretensioning force can be selectively and permanently adjusted. In this instance, using the mechanical pretensioning means, a constant and/or mechanically adjustable or predeterminable (predefined) transverse force can be applied to the tappet. However, a defined pretensioning force cannot be adjusted with a resilient O-ring seal and in particular cannot be permanently or constantly maintained since the (cross-section) geometry of the O-ring seal changes, on the one hand, as a result of abrasion and, on the other hand, as a result of fluid absorption (swelling). In other words, the O-ring seal is not fatigue-resistant. The material removal of the O-ring could additionally have negative effects on the entire system in the form of particles.

According to an advantageous embodiment, it is proposed that the mechanical means apply a transverse force (transversely to the stroke direction) to the tappet during a stroke movement of the tappet. This means in other words in particular that the mechanical means is configured during a stroke movement of the tappet to apply a transverse force to the tappet.

This transverse force may, for example, be applied to the tappet only during a portion of the stroke or during the entire stroke. The transverse force may in this instance act on the tappet in such a manner that there is a selective redirection and/or tilting of the tappet in the guide element and/or relative to the guide element.

As a material for the fatigue-resistant, mechanical means, it is possible to use, for example, a fatigue-resistant plastics material (that is to say, not rubber) or a metal alloy. According to another advantageous embodiment, it is proposed that the mechanical means be metal.

According to another advantageous embodiment, it is proposed that the mechanical (pretensioning) means be a spring. In this instance, it may in principle be a flexible spring, pressure spring, tension spring or a torsion spring.

According to another advantageous embodiment, it is proposed that the mechanical (pretensioning) means be a flexible spring. The construction variant with a flexible spring is particularly advantageous for reducing possible valve oscillations permanently with a defined pretensioning force, with a nonetheless simple capacity for assembly.

According to another advantageous embodiment, it is proposed that the flexible spring be orientated in the stroke direction or transversely to the stroke direction. To this end, the flexible spring may be orientated in the longitudinal direction of the guide element or in a radial direction or a peripheral direction of the guide element.

According to another advantageous embodiment, it is proposed that there be provided at least two mechanical means which are arranged so as to be distributed along a periphery around the tappet. Preferably, two, three or four mechanical means are provided. In a particularly preferred manner, the at least two mechanical means are in this instance arranged so as to be distributed in a uniform (or equidistant) manner.

According to another advantageous embodiment, it is proposed that the mechanical means be integrated in the guide element and/or be formed integrally therewith. In particular, the mechanical means and the guide element are securely connected to each other and/or produced integrally with each other. For example, the mechanical means may be produced from the material of the guide element, in particular the mechanical means is formed from a wall (a cover) of the guide element which in particular connects two end sides of the guide element to each other.

It is thereby possible in a particularly advantageous manner to produce a flexible spring guide for oscillation reduction on the valve. The flexible spring may, for example, be produced as a bending/shaped portion of the surrounding sleeve. This additionally affords the advantage that no additional assembly step is required to connect the flexible spring and sleeve.

According to another advantageous embodiment, it is proposed that the guide element be a sleeve. The sleeve may in this instance delimit and/or form a longitudinal channel (at the peripheral side) which connects the valve inlet to the valve outlet.

According to another advantageous embodiment, it is proposed that the guide element be a resilient sleeve, on which a pretensioning element which pretensions the tappet in a stroke direction is supported. This pretensioning element may, for example, be a (pressure) spring which pretensions a closure member which is arranged on the tappet with respect to the valve seat.

According to another aspect, a hydraulic system for a motor vehicle is also described comprising a valve which is described here. The hydraulic system may in this context be a component of a driver assistance system and/or a safety system, such as, for example, an ABS or ESP system or cooperate therewith.

The details, features and advantageous embodiments mentioned in connection with the valve may accordingly also occur in the hydraulic system set out here and vice versa. In this regard, complete reference may be made to the statements therein for more detailed specification of the features.

BRIEF DESCRIPTION OF THE DRAWINGS

The solution set out here and the technical environment thereof are explained in greater detail below with reference to the Figures. It should be noted that the disclosure is not intended to be limited by the embodiments shown. In particular, unless otherwise explicitly illustrated, it is also possible to extract part-aspects of the content explained in the Figures and to combine them with other components and/or knowledge from other Figures and/or from the present description. In the schematic drawings.

DETAILED DESCRIPTION

Figure 1:
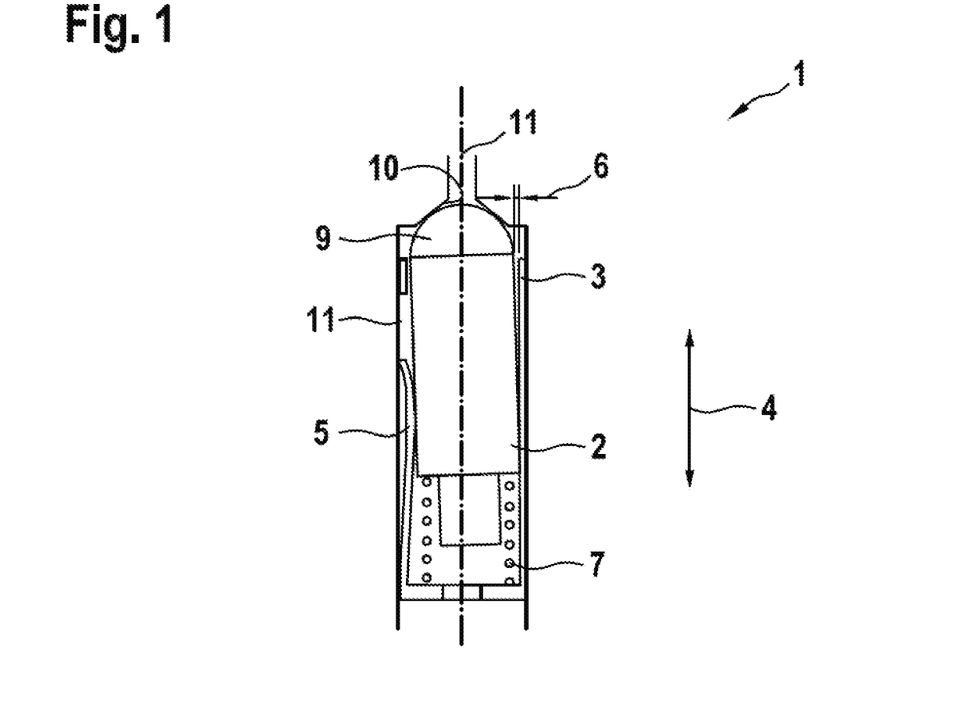
FIG. 1: is a side view of a valve proposed here and illustrated in cross-section.

FIG. 1 is a schematic side view of a valve 1 proposed in this instance and illustrated in cross-section. The valve 1 is configured for variable throttling of a hydraulic flow. It comprises a tappet 2 and a guide element 3, in which the tappet 2 is guided for movement in a stroke direction 4. The valve 1 has at least one fatigue-resistant, mechanical (pretensioning) means 5 which locally reduces a radial play 6 of the tappet 2 in order to reduce possible valve oscillations. To this end, the mechanical (pretensioning) means 5 is configured to apply a transverse force to the tappet 2 during a stroke movement of the tappet 2.

The mechanical (pretensioning) means 5 is in this instance by way of example a flexible spring. Furthermore, the mechanical means 5 is in this instance integrated by way of example into the guide element 3 and formed integrally therewith (cf. in this regard also the illustration according to FIG. 2). In addition, the guide element 3 is in this instance, for example, a sleeve which is further configured by way of example as a resilient sleeve on which a pretensioning element 7 which pretensions the tappet 2 in the stroke direction 4 is supported.

At the end of the tappet 2 opposite the pretensioning element 7, there is arranged a valve closure member 9 which can be moved by means of the tappet 2 toward a valve seat 10 and away from it again. As a result of a stroke movement of the valve closure member 9 away from the valve seat 10, there is released a flow path which connects the two valve openings 11 to each other.

Figure 2:
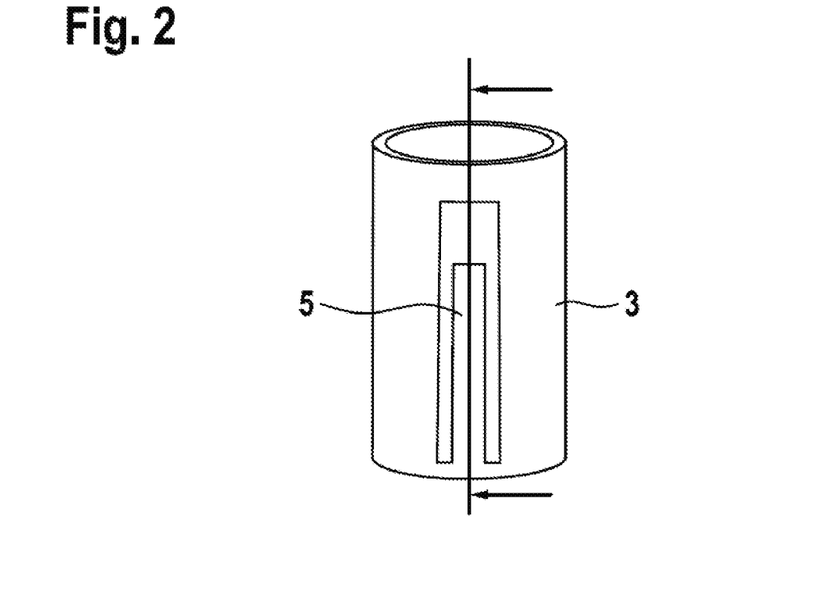
FIG. 2: is a perspective view of the guide element of the valve of FIG. 1, FIG. 3: is a perspective view of an alternative embodiment of the guide element from FIG. 2, FIG. 4: is a perspective view of another alternative embodiment of the guide element from FIG. 2, FIG. 5: is a plan view of a possible mutual arrangement of the tappet, guide element and mechanical means.

FIG. 2 is a schematic, perspective view of the guide element 3 of the valve 1 from FIG. 1. The line of section relating to the sectioned illustration illustrated in FIG. 1 is illustrated and marked with arrows in FIG. 2.

FIGS. 1 and 2 show in this context a possible embodiment of the valve 2. The sleeve 3 has the functions of firstly pretensioning the helical spring 7 to a specific length so that a desired opening pressure is achieved and, secondly, guiding the valve tappet 2. As a result of tolerances and the capacity for assembly, a minimum gap 6 should be provided between the sleeve 3 and the tappet 2.

From the sleeve 3, in order to form the mechanical (pretensioning) means 5 at one or more locations, there is formed a contour which (locally) further limits the radial freedom of movement between the tappet 2 and sleeve 3. The mechanical (pretensioning) means 5 is in this instance shown by way of example as a type of flexible spring. To this end, the contour moves the tappet 2 at one or more locations and consequently ensures selective redirection and/or tilting. The radial play 6 can consequently be freely reduced (locally) up to 0 μm [zero micrometers], whereby a radial oscillation can be considerably reduced. Furthermore, axial oscillations can also be reduced by the present friction at the contact locations.

Figure 3:
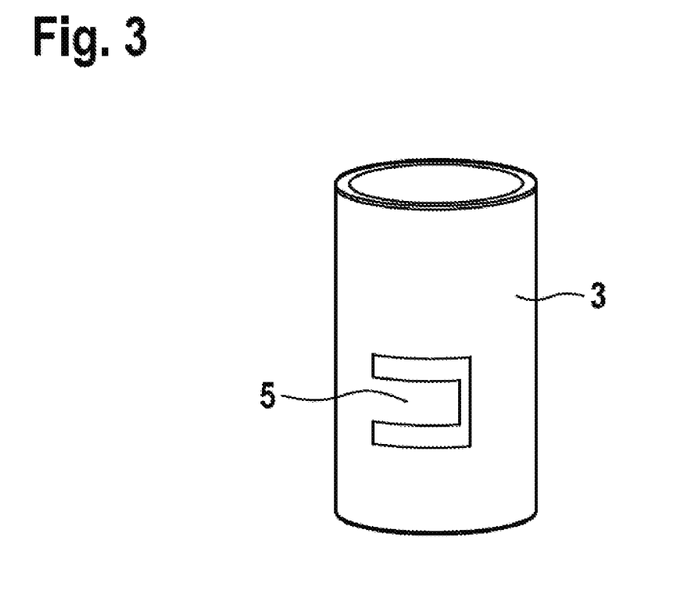

FIG. 3 is a schematic, perspective view of an alternative embodiment of the guide element from FIG. 2. For example, the flexible spring is constructed in a peripheral direction. Any positions are possible. This represents an example that and how the flexible spring can be orientated transversely relative to the stroke direction 4.

Figure 4:
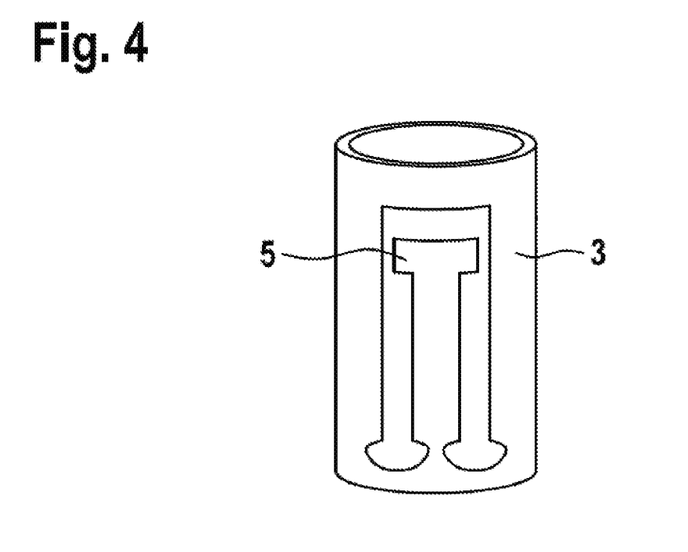

FIG. 4 is a schematic, perspective view of another alternative embodiment of the guide element from FIG. 2. The illustration according to FIG. 4 represents an example that and how the flexible spring can be orientated in the travel direction 4. Furthermore, in FIG. 4, shape changes of the contour are additionally indicated and can contribute to a reduction of material tensions under loading.

Figure 5:
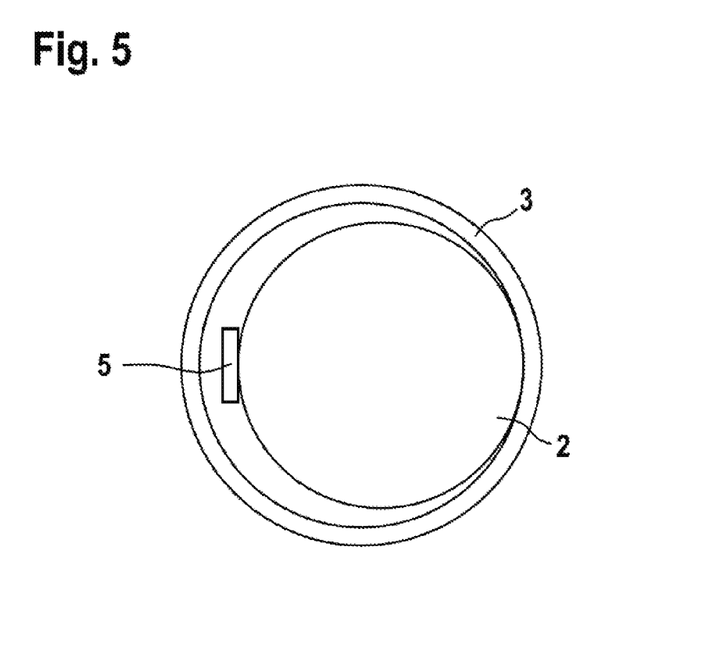

FIG. 5 is a schematic plan view of a possible mutual arrangement of the tappet 2, guide element 3 and mechanical means 5.

Figure 6:
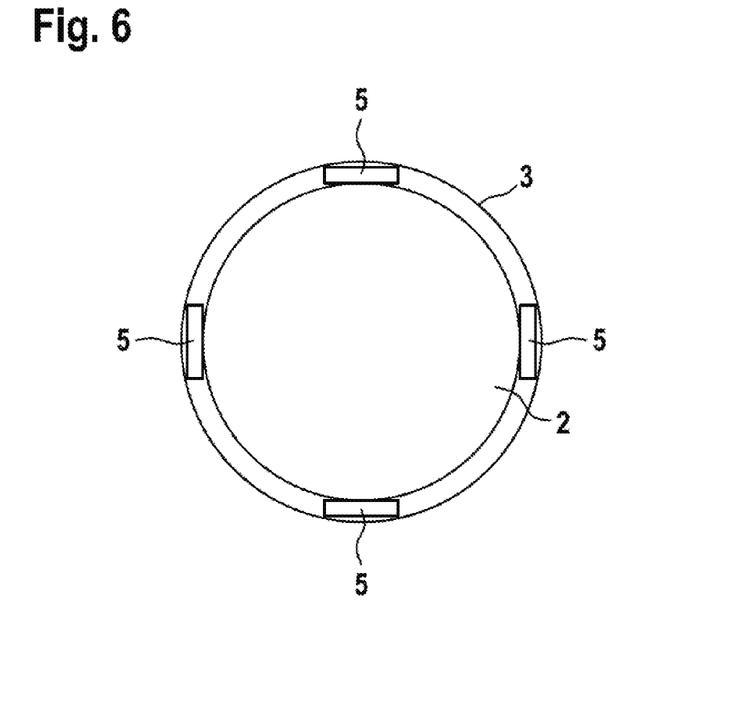
FIG. 6: is a plan view of another possible mutual arrangement of the tappet, guide element and mechanical means.

FIG. 6 is a schematic plan view of another possible mutual arrangement of the tappet 2, guide element 3 and mechanical means 5. In this context, FIG. 6 illustrates an example that and how at least two (in this instance, four) mechanical (pretensioning) means 5 may be provided and are arranged so as to be distributed along a periphery around the tappet 2.

In this context, FIGS. 5 and 6, image 3 are plan views of other flexible springs. The number of flexible springs can be freely selected.

Figure 7:
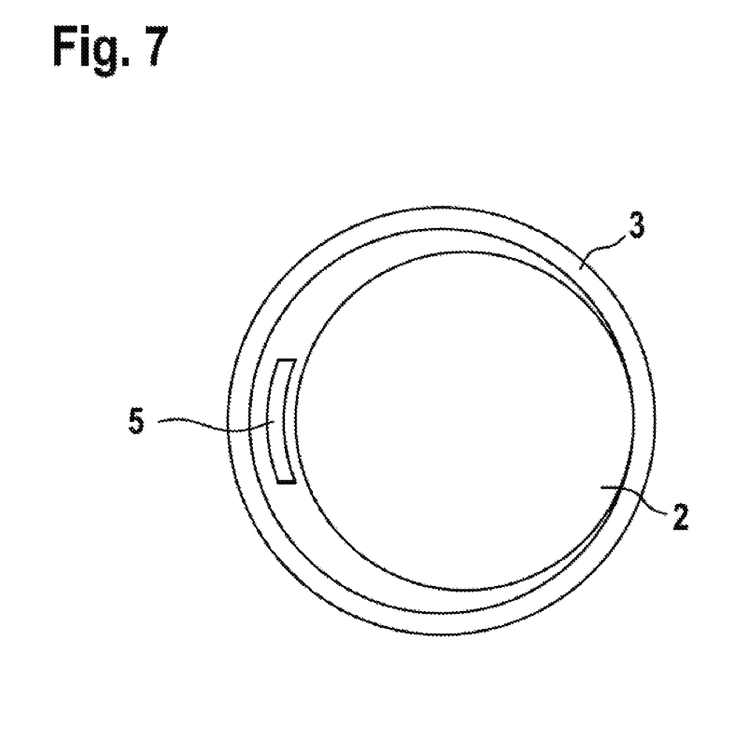
FIG. 7: is a plan view of another possible mutual arrangement of the tappet, guide element and mechanical means.

FIG. 7 is a schematic plan view of another possible mutual arrangement of the tappet 2, guide element 3 and mechanical means 5.

Figure 8:
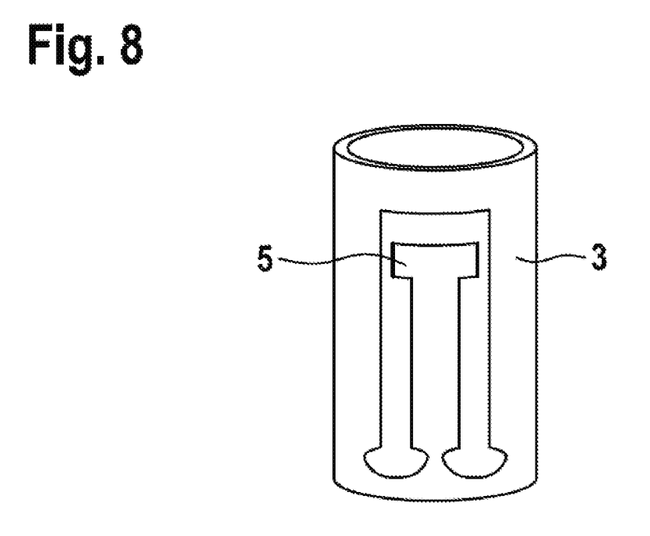
FIG. 8: is a perspective view of the embodiment of the guide element from FIG. 7.

FIG. 8 is a schematic, perspective view of the embodiment of the guide element 3 from FIG. 7.

In the additional exemplary embodiment shown in FIGS. 7 and 8, the flexible spring 5 is additionally curved in terms of the width. In other words, this can also be described in such a manner that a flexible spring 5 which is orientated in the stroke direction 4 (cf. FIG. 1) may have at least in a (longitudinal) portion, in particular in an upper portion, a curvature in a radial direction and/or in a peripheral direction. Furthermore, any shapes are conceivable.

The spring retention member 3 from FIGS. 7 and 8 may, for example, be produced from a metal sheet by means of punching out and shaping. This is explained in greater detail below with reference to FIG. 9.

Figure 9:
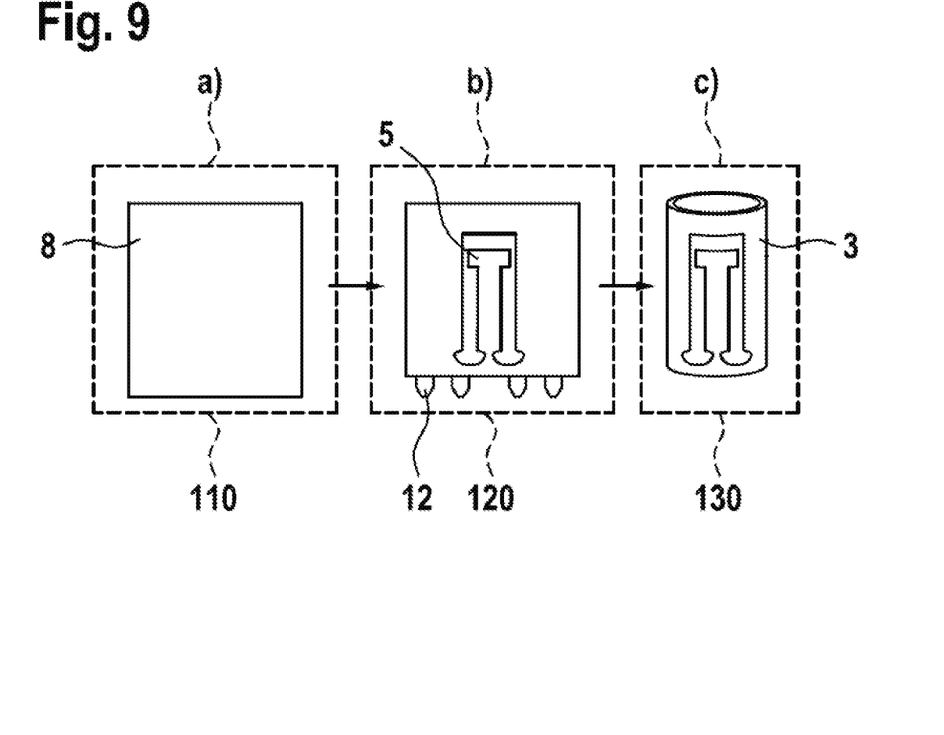
FIG. 9 shows the sequence of an exemplary method for common production of a guide element and a mechanical means for a valve described here.

FIG. 9 schematically shows the sequence of an exemplary method for common production of a guide element 3 and a mechanical means 5 for a valve 1 described in this instance. The method is used for the common production of a guide element 3 and at least one mechanical pretensioning means 5 for a valve 1 described in this instance. In this context, the method steps a), b) and c) and the exemplary sequence thereof are illustrated using the blocks 110, 120 and 130.

In block 110, according to step a) a metal sheet 8 is provided. In block 120, according to step b) the metal sheet 8 is punched. In block 130, according to step c) the metal sheet 8 is shaped.

In this context, a possible cost-effective production principle is illustrated as an example. From a flat metal sheet 8, the contour is punched free around the flexible spring 5, in the same manner as the schematically illustrated base segments 12. In the next step, the flexible spring 5 obtains the desired contour by means of stamping. In the final shaping process, the component is shaped to form the sleeve 3 and the base segments 12 are angled.

Alternatively, the base member 3 may first be produced as a deep-drawn component with subsequent punching out (of the flexible spring 5).

As another alternative, the flexible spring 5 may also be produced in place of punching out only by means of shaping the resilient sleeve 3. One possible result of such a production method is illustrated by way of example in FIG. 10.

Figure 10:
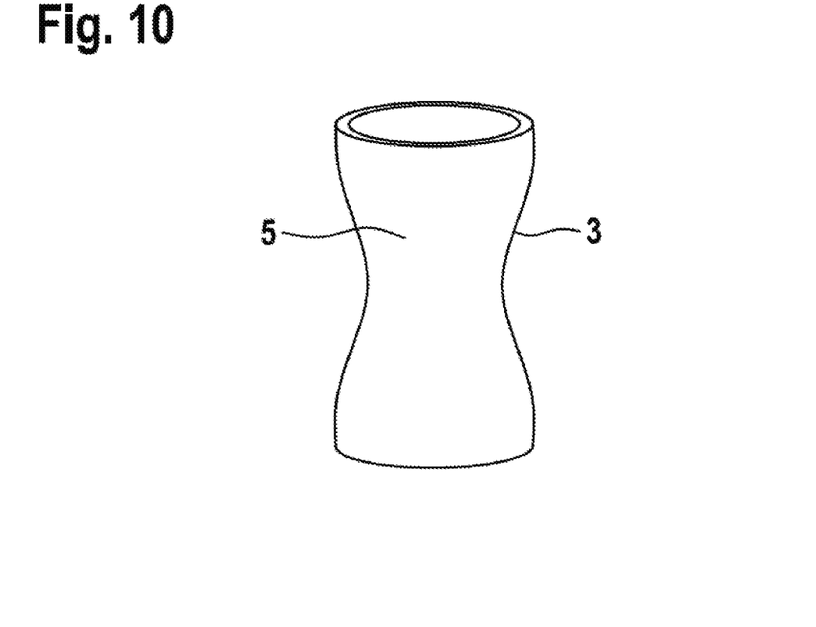
FIG. 10: is a perspective view of another alternative embodiment of the guide element from FIG. 2.

FIG. 10 is a schematic, perspective view of another alternative embodiment of the guide element 3 from FIG. 2.

Figure 11:
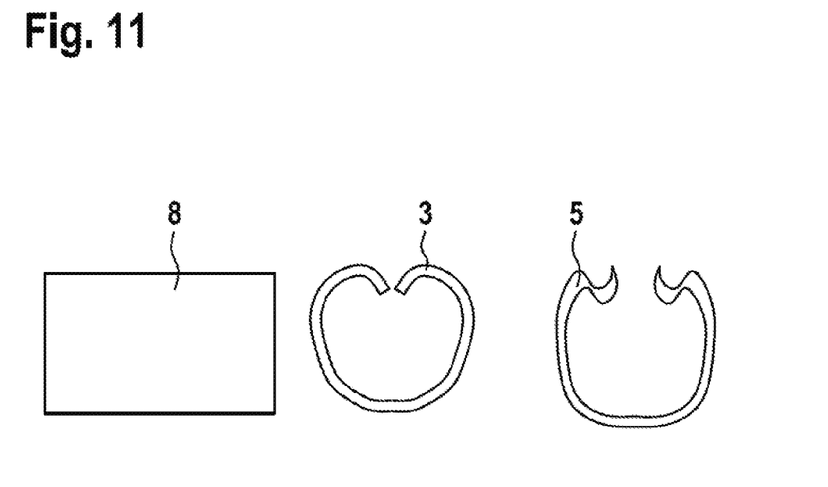
FIG. 11: shows the sequence of another exemplary method for common production of a guide element and a mechanical means for a valve described here.

FIG. 11 schematically illustrates the sequence of another exemplary method for common production of a guide element 3 and a mechanical means 5 for a valve 1 described in this instance.

In FIG. 11, the flexible spring 5 is produced in such a manner that the bent metal sheet 8 is not connected at the ends and consequently a specific resilient action is present over the periphery of the metal sheet 8 (which is bent relative to the sleeve 3).

Figure 12:
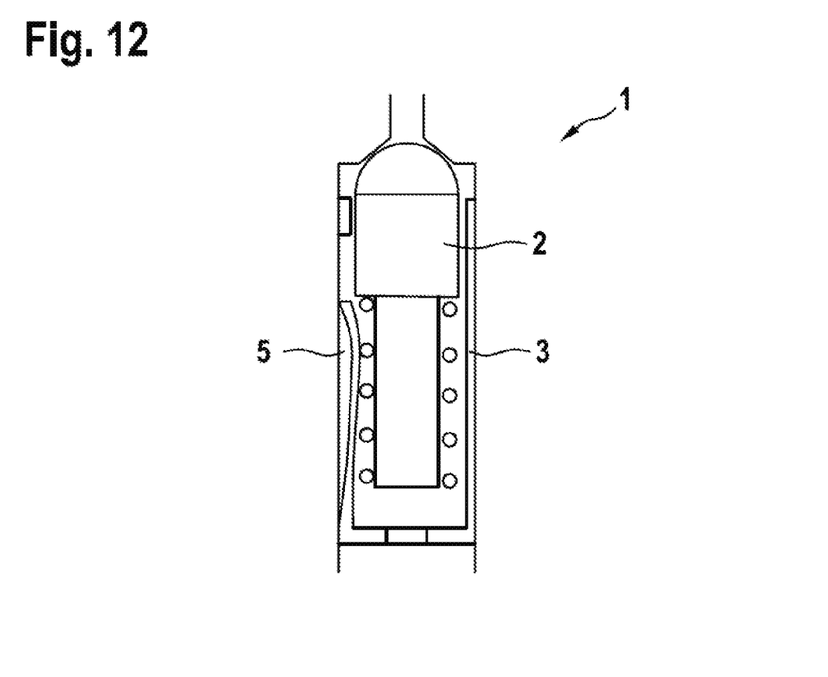
FIG. 12: is a side view of another valve proposed here and illustrated in cross-section.

FIG. 12 is a schematic side view of another valve 1 proposed here and illustrated in cross-section. FIG. 12 shows that the engagement of the flexible spring 5 in the valve does not have to be present initially (that is to say, already with a closed valve).

Figure 13:
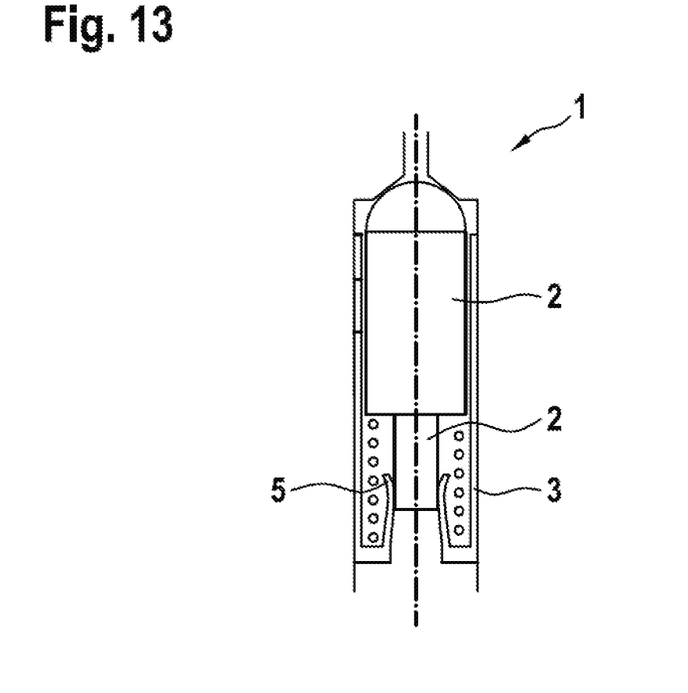
FIG. 13: is a side view of another valve proposed here and illustrated in cross-section.

FIG. 13 is a schematic side view of another valve 1 proposed here and illustrated in cross-section. In FIG. 13, the engagement location of the flexible spring 5 is not indicated at the largest diameter of the tappet 2, but instead at any other location. In this instance, the flexible spring 5 may be shaped from the resilient sleeve 3 (as illustrated in FIG. 13), or by means of an additional component (as illustrated in FIG. 14).

Figure 14:
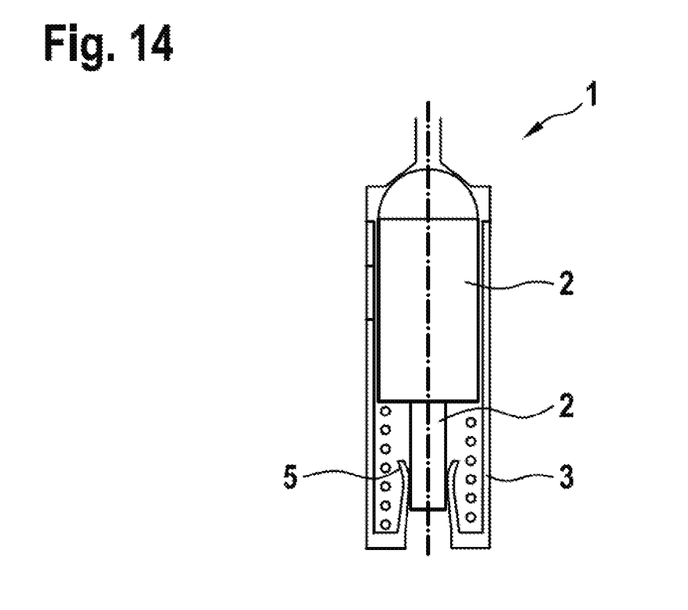
FIG. 14: is a side view of another valve proposed here and illustrated in cross-section.

FIG. 14 is a schematic side view of another valve 1 proposed here and illustrated in cross-section. In FIG. 14, the flexible spring 5 is formed by means of a component which is additional to the resilient sleeve 3 (but in particular releasably connected to the resilient sleeve 3).

What is claimed is:

1. A valve for variable throttling of a hydraulic flow, comprising:
    a tappet;
    a guide element in which the tappet is guided for movement in a stroke direction; and
    at least one fatigue-resistant, mechanical member that locally reduces a radial play of the tappet by applying a transverse force to the tappet during a stroke movement of the tappet so as to reduce valve oscillations, the at least one mechanical member being arranged radially outside the tappet.

2. The valve according to claim 1, wherein the at least one mechanical member is metal.

3. The valve according to claim 1, wherein the at least one mechanical member includes a spring.

4. The valve according to claim 3, wherein the spring is a flexible spring.

5. The valve according to claim 4, wherein the flexible spring extends in the stroke direction.

6. The valve according to claim 1, wherein the at least one mechanical member includes at least two mechanical members that are distributed along a periphery around the tappet.

7. The valve according to claim 1, wherein the at least one mechanical member is integrated at least in the guide element or is formed integrally the guide element.

8. The valve according to claim 7, wherein the guide element includes a sleeve.

9. The valve according to claim 1, wherein the guide element includes a resilient sleeve on which a pretensioning element is supported, and wherein the pretensioning element pretensions the tappet in the stroke direction.

10. The valve according to claim 4, wherein the flexible spring extends transversely to the stroke direction.

11. The valve according to claim 8, wherein the sleeve defines a cut-out region, and the at least one mechanical member is arranged in the cut-out region.

12. The valve according to claim 11, wherein the at least one mechanical member projects radially inwardly from the sleeve into contact with an outer surface of the tappet so as to apply the transverse force to the tappet.

* * * * *